United States Patent
Sakatani

(10) Patent No.: US 7,233,858 B2
(45) Date of Patent: Jun. 19, 2007

(54) DATA PROVIDING SERVICE SYSTEM

(75) Inventor: Susumu Sakatani, Ehime (JP)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 160 days.

(21) Appl. No.: 10/498,010

(22) PCT Filed: Dec. 9, 2002

(86) PCT No.: PCT/JP02/12849

§ 371 (c)(1),
(2), (4) Date: Jun. 16, 2004

(87) PCT Pub. No.: WO03/052655

PCT Pub. Date: Jun. 26, 2003

(65) Prior Publication Data

US 2005/0075786 A1    Apr. 7, 2005

(30) Foreign Application Priority Data

Dec. 17, 2001    (JP) ............................. 2001-383661

(51) Int. Cl.
*G01C 21/00* (2006.01)

(52) U.S. Cl. ................. 701/200; 701/207; 342/357.01; 342/357.09

(58) Field of Classification Search ................ 701/200, 701/201, 207, 208, 210, 212, 213; 342/357.01, 342/357.06, 357.09, 357.1
See application file for complete search history.

(56) References Cited

U.S. PATENT DOCUMENTS 6,662,105 B1 * 12/2003 Tada et al. .................. 701/209

2001/0056443 A1 * 12/2001 Takayama et al. .......... 707/513

FOREIGN PATENT DOCUMENTS

| JP | 2000-123027 | 4/2000 |
| JP | 2001-306605 | 11/2001 |
| JP | 2001-346232 | 12/2001 |
| TW | 243514 | 3/1995 |
| TW | 317618 | 10/1997 |
| TW | 353735 | 3/1999 |
| TW | 459186 B | 10/2001 |

* cited by examiner

*Primary Examiner*—Gertrude A. Jeanglaude
(74) *Attorney, Agent, or Firm*—Armstrong, Kratz, Quintos, Hanson & Brooks, LLP

(57) ABSTRACT

A data-providing service system of the present invention provides a user with data of an apparatus having a navigation function which outputs current position information. The data-providing service system provides a content provider such as restaurant, amusement, tourism guidance, hotel, music service and the like with content information, receives the content information, provides the user with information requesting membership registration, receives personal information from the user and provides the user with the content information. The content information includes link information for linking with personal information, and link information for linking primary judging information such as time information, climate information, environment information other than position information, or for linking with secondary judging information concerning the user such as personal identification information, hobby/taste information, using state/frequency information and the like. When current position information is outputted by the navigation function, the linked content information is outputted in accordance with the primary judging information or the secondary judging information.

3 Claims, 3 Drawing Sheets

DATA PROVIDING SERVICE SYSTEM

TECHNICAL FIELD

The present invention relates to a data-providing service system for providing, to a user, content information such as restaurant, amusement, tourism guidance, hotel and music service.

BACKGROUND TECHNIQUE

In recent years, many of car navigation systems which have become widespread not only show a current position on a map but also show previously registered stores, gas stations and the like on the map.

There are services for providing advertisements provided by advertisement sponsors to general users using the Internet (e.g., Japanese Patent No. 2756483).

There are employed many systems for displaying information which matches to preset selection criteria from registered information on a terminal of a person who registered the information (e.g., Japanese Patent Application Laid-open No. 2001-222645).

However, services which can be displayed in the current car navigation system are not provided in accordance with hobby or taste of the user, and information suitable for weather or season is not provided.

It is an object of the present invention to provide a data-providing service system which provides music suitable for a purpose, a place or a season at the time of utilization, or which displays a restaurant or a roomage suitable for hobby and taste of a user.

It is another object of the invention to allow a user to obtain content information peculiar to that area utilizing a terminal installed in each place.

DISCLOSURE OF THE INVENTION

A first aspect of the present invention provides a data-providing service system for providing a user with data which is used for an apparatus having a navigation function which outputs current position information, comprising a step for providing information which requests content information to a content provider who provides restaurant, amusement, tourism guidance, hotel, music service and the like; a step for receiving content information from the content provider, a step for receiving personal information from the user, and a step for providing the user with the content information, wherein the content information to be provided for the user includes link information linked with position information, and link information linked with primary judging information such as time information, climate information, environment information and the like other than the position information, or linked with secondary judging information concerning the user such as personal identification information, hobby/taste information, using state/frequency information and the like, and when current position information is outputted by the navigation function, the content information linked based on the link information is outputted in accordance with the primary judging information or the secondary judging information.

According to this aspect, music or restaurant information suitable for time band or climate at the time of utilization is displayed, or past vacationlands and hotels near the current position suitable for using state and taste are displayed.

A second aspect of the invention provides a data-providing service system for providing a user with data which is used for an apparatus having a navigation function which outputs current position information, comprising a management server, and a local terminal for sending and receiving data through the management server and a communication network, wherein the management server includes content information, personal information of a user, link information for linking the content information and position information with each other, link information for linking primary judging information such as time information, climate information, environment information and the like other than the position information, and link information for linking secondary judging information concerning the user such as personal identification information, hobby/taste information, using state/frequency information and the like, the data-providing service system comprises a step for providing information which requests content information to a content provider who provides restaurant, amusement, tourism guidance, hotel, music service and the like from the management server, a step for receiving the content information from the content provider by the management server, a step for receiving personal information from the user by the management server, a step for receiving the content information and the link information from the management server by the local terminal in accordance with a request from the user, and a step for providing the user with the content information and the link information received from the management server by the local terminal, and when current position information is outputted by the navigation function, the content information linked based on the link information is outputted in accordance with the primary judging information or the secondary judging information.

According to this aspect, music or restaurant information suitable for time band or climate at the time of utilization is displayed, or past vacationlands and hotels near the current position suitable for using state and taste are displayed. The data-providing service system also includes the step for providing information which requests content information to a content provider who provides restaurant, amusement, tourism guidance, hotel, music service and the like from the management server, and the step for receiving the content information from the content provider by the management server. Since the content information to be provided for the user is received directly from the content provider utilizing the communication network such as the internet, timely information can always be renewed. Since the data-providing service system has the step for receiving the personal information from the user, users or various information concerning the users can timely be registered. Since the local terminal provides the user with the content information, the user can utilize a terminal installed in each area, and can obtain the content information peculiar to that area.

A third aspect of the invention provides a data-providing service system for providing a user with content information such as restaurant, amusement, tourism guidance, hotel, music service and the like, comprising a step for receiving personal information from the user, and a step for providing the user with the content information, wherein the content information to be provided for the user includes link information for linking with primary judging information such as position information, time information, climate information, environment information and the like, or for linking with secondary judging information concerning the user such as personal identification information, hobby/taste information, using state/frequency information and the like, the content information is outputted in accordance with the primary judging information or the secondary judging information.

According to this aspect, music or restaurant information suitable for time band or climate at the time of utilization is outputted, or past vacationlands and hotels suitable for using state and taste are outputted.

A fourth aspect of the invention provides a data-providing service system for providing a user with content information such as restaurant, amusement, tourism guidance, hotel, music service and the like, comprising a management server, and a local terminal for sending and receiving data through the management server and a communication network, wherein the management server includes content information, personal information of a user, and link information for linking the content information with primary judging information such as position information, time information, climate information, environment information and the like; or link information for linking the content information with secondary judging information concerning the user such as personal identification information, hobby/taste information, using state/frequency information and the like, the data-providing service system comprises a step for receiving personal information from the user by the management server, a step for receiving the content information and the link information from the management server by the local terminal in accordance with a request from the user, and a step for providing the user with the content information and the link information received from the management server by the local terminal, the content information is outputted in accordance with the primary judging information or the secondary judging information.

According to this aspect, music or restaurant information suitable for time band or climate at the time of utilization is outputted, or past vacationlands and hotels suitable for using state and taste are outputted. Since the data-providing service system has the step for receiving the personal information from the user, users and various information concerning the users can timely be registered. Since the local terminal provides the user with the content information, the user can utilize a terminal installed in each area, and can obtain the content information peculiar to that area.

A fifth aspect of the invention provides an information providing terminal apparatus wherein content information such as restaurant, amusement, tourism guidance, hotel, music service and the like is extracted from primary judging information such as position information, time information, climate information, environment information and the like; or from secondary judging information concerning a user such as personal identification information, hobby/taste information, using state/frequency information and the like; and the content information is stored in a storing medium.

According to this aspect, the user can extract music or restaurant information suitable for the selected area or season from this information providing terminal apparatus, or can extract vacationland or hotel suitable for the past using state or taste, and can store the same in the storing medium such as a CD-ROM.

A sixth aspect of the invention provides an information providing terminal apparatus comprising inputting means for inputting membership information of a user, communicating means for sending the membership information inputted by the inputting means, and for receiving content information such as restaurant, amusement, tourism guidance, hotel, music service and the like extracted based on the membership information, and writing means for storing, in storing medium, the content information received by the communicating means.

According to this aspect, if the user inputs his or her own membership number into this information providing terminal apparatus, the user can extract vacationland or hotel suitable for the past using state or taste and can store the same in the storing medium such as a CD-ROM.

According to a seventh aspect of the invention, in the information providing terminal apparatus of the sixth aspect, the terminal information is sent by the communicating means, and the content information is selected by the sent terminal information.

According to this aspect, since the content information to be received is selected based on the terminal information, only vacationland or hotel concerning an area where the terminal information is disposed can be extracted. By limiting the information to be extracted in this manner, it is possible to add the additional information to the information to be provided.

An eighth aspect of the invention provides an information providing terminal apparatus comprising inputting means for inputting primary judging information such as position information, time information, climate information, environment information and the like; or secondary judging information concerning a user such as personal identification information, hobby/taste information, using state/frequency information and the like; communicating means for sending data inputted by the inputting means, and for receiving content information such as restaurant, amusement, tourism guidance, hotel, music service and the like extracted based on the data, and writing means for storing, in storing medium, the content information received by the communicating means.

According to this aspect, if the user inputs information such as current position, time band, the user's membership number and taste into this information providing terminal apparatus, it is possible to extract vacationland or hotel suitable for the inputted condition, and to store the same in the storing medium such as a CD-ROM.

According to a ninth aspect of the invention, in the information providing terminal apparatus according to any one of the fifth to eighth aspects, the content information includes link information for linking with the primary judging information, or link information for linking with the secondary judging information.

According to this aspect, the content information extracted by the user and stored in the storing medium such as a CD-ROM can be selectively outputted utilizing the link information.

A tenth aspect of the invention provides a storing medium for storing content information such as restaurant, amusement, tourism guidance, hotel, music service and the like; and link information for liking the content information with secondary judging information concerning a user such as personal identification information, hobby/taste information, using state/frequency information and the like.

According to this aspect, the user can selectively output the content information in accordance his or her own taste or past using state utilizing the stored link information.

According to an eleventh aspect of the invention, in the storing medium of the tenth aspect, the storing medium further stores link information for linking the content information with primary judging information such as position information, time information, climate information, environment information and the like.

According to this aspect, the user can selectively output the content information in accordance with time band or climate.

According to a twelfth aspect of the invention, in the data providing apparatus of tenth or eleventh aspect, the apparatus further comprises control means into which primary judging information such as position information, time information, climate information, environment information and the like is inputted, wherein the control means extracts and displays the content information stored in the storing medium based on the inputted primary judging information.

According to this aspect, the user can selectively output the content information in accordance with time band or climate.

According to a thirteenth aspect of the invention, in the data providing apparatus of the twelfth aspect, the apparatus further comprises communicating means for receiving the primary judging information.

According to this aspect, since the user can obtain position information or climate information using the communicating means, it is possible to timely obtain precise information.

A fourteenth aspect of the invention provides a data providing apparatus comprising primary judging information storing means for storing primary judging information such as position information, time information, climate information, environment information and the like; secondary judging information storing means for storing secondary judging information concerning a user such as personal identification information, hobby/taste information, using state/frequency information and the like; content information storing means for storing content information having link information which links the primary judging information and the secondary judging information with each other, condition setting means for selecting judgment information from the primary judging information and the secondary judging information, judgment information extracting means for extracting the judgment information selected by the condition setting means from the primary judging information storing means or the secondary judging information storing means, content information extracting means for extracting content information linked with the judgment information extracted by the judgment information extracting means, and outputting means for displaying content information extracted by the content information extracting means.

According to this aspect, the user can selectively output the content information in accordance with the primary judging information such as time band or climate, and the secondary judging information concerning the user's taste or past using state.

BEST MODE FOR CARRYING OUT THE INVENTION

A data-providing service system according to an embodiment of the present invention will be explained below.

Figure 1:
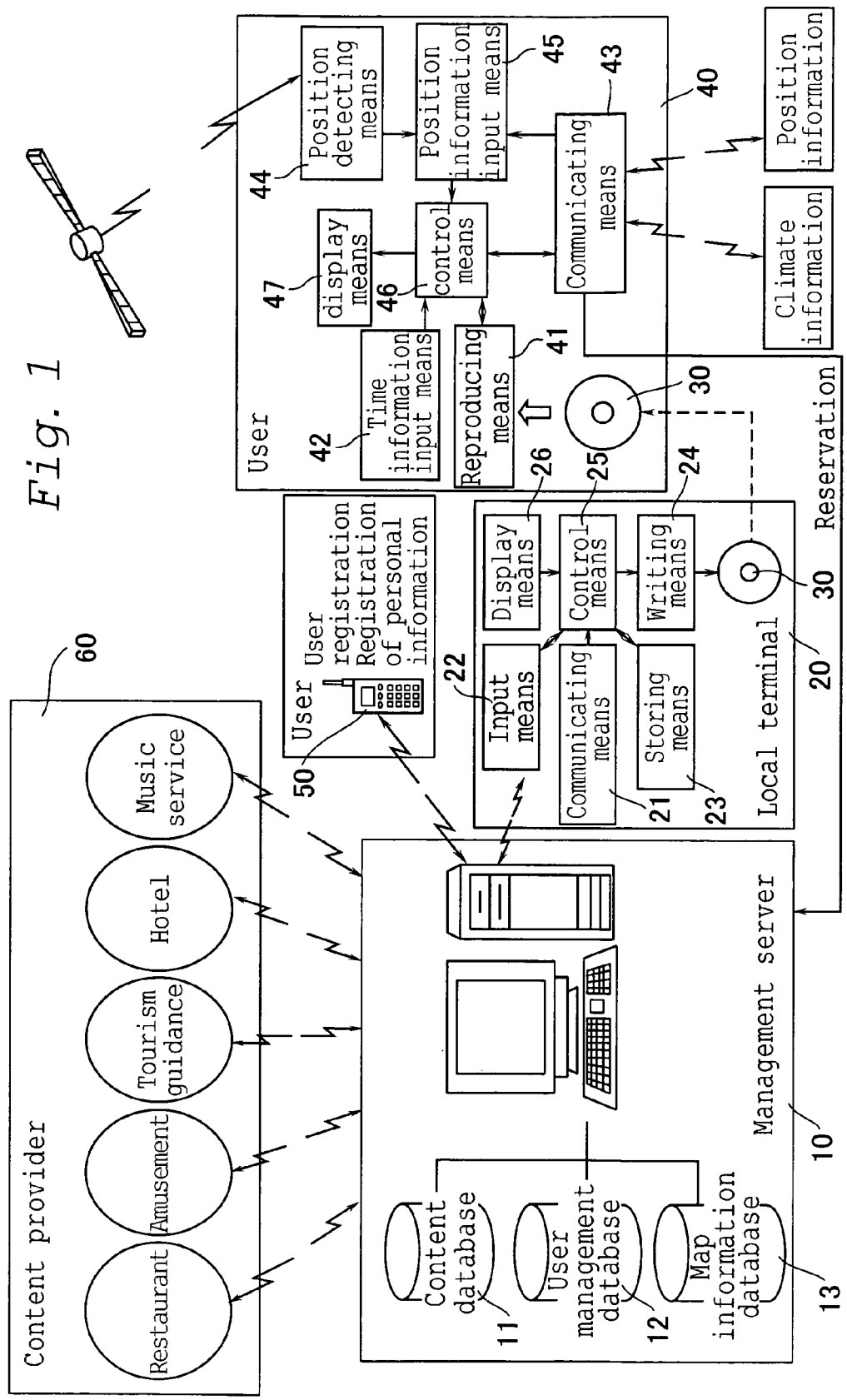
FIG. 1 is a block diagram of a data-providing service system according to an embodiment of the present invention.

FIG. 1 is a block diagram of the data-providing service system according to the embodiment.

As shown in FIG. 1, the data-providing service system of the embodiment comprises a management server 10 and a local terminal 20 which sends and receives data by means of the management server 10 and a communication network.

The management server 10 comprises a content database 11 for storing content information, a user management database 12 for storing personal information of a user, and a map information database 13 for storing map information. The content information stored in the content database 11 includes link information which linked with primary judging information such as position information, time information, climate information and environment information; and link information linked with secondary judging information concerning a user such as personal identification information, hobby/taste information and using state/frequency information. This link information may be included in an independent database or in the map information database 13.

Here, the content information includes restaurant information, tourism amusement information, roomage information, music information such as restaurant, amusement, tourism guidance, hotel, music and the like. The content information also includes information concerning other goods and service providers.

The personal information of a user is information concerning the user including personal identification information such as membership number, name, age, sex, family, birthday, birth date and the like; information concerning hobby/taste such as music, sports, actor, actress, drink and the like; using state/frequency information based on past track records such as resort, lodging, restaurant and the like; treatment/diagnosis information such as chart data; and evaluation information concerning utilized goods and services. This personal information is registered at the time of user's registration or by response to questionnaire, or the information is accumulated together with data registration when contents are reserved, utilized or fee is paid.

The primary judging information is judging information which is common to all users such as position information, time information, climate information, environment information and the like. For example, the position information is information for specifying a place or an area on a map such as latitude/longitude, city name, town name, place name, address, zip code and the like. The time information is information for specifying time or period such as year, month, date and time. The climate information is information for specifying seasons (spring, summer, fall and winter) and weather such as clear weather, rain, snow, cloud, thunder, tsunami and the like. The environment information is information concerning atmosphere such as temperature/moisture, carbon dioxide and contamination. The primary judging information also includes other information such as traffic jam, traffic accident, construction and the like.

The secondary judging information is information concerning an individual user such as personal identification information, hobby/taste information, using state/frequency information and the like.

The link information with respect to the primary judging information is for linking working time of a restaurant with time information, or linking utilizing period of camp ground or slope with season or weather information, for example.

The link information with respect to the secondary judging information is for linking a restaurant with propriety or rank of meal in accordance with taste, or linking information concerning the number of past utilization with roomage, for example.

The local terminal 20 comprises inputting means 21 for inputting member information, communicating means 22 which sends the membership information which was inputted by the inputting means 21 to the management server 10 and which receives content information which was extracted based on the membership information from the management server 10, storing means 23 for storing the content information received by the communicating means 22, writing means 24 for allowing a medium 30 to store the content information stored in the storing means 23, control means 25 for controlling the communication and the writing operation, and display means 26 for displaying the input and output contents.

The local terminal 20 is an information providing terminal apparatus which is disposed in a service providing store such as convenience store, gas station, car dealer and the like in each area. It is effective that a vending machine for providing drinks and food has a function of the local terminal 20.

The inputting means 21 may use operation buttons such as a keyboard, may be a touch panel using the display means 26, may read identification data such as bar cord displayed on a display section of a portable terminal such as a cellular phone, or may read personal identification data such as ID card in a contact manner or non-contact manner. The membership information of a user, the primary judging information or the secondary judging information as explained in the embodiment instead of the membership information may be inputted from the inputting means 21. A portion of the information inputted by the inputting means 21 is not sent by the communicating means 22, and can be used for retrieving information stored in the local terminal 20.

The information sent from the communicating means 22 is sent together with information inputted by the inputting means 21 and together with information stored in the local terminal 20. The information stored in the local terminal 20 includes terminal identification number for specifying the local terminal 20, area identification number of an area where the local terminal 20 is installed or disposed, and manager's number of a manager who manages or owns the local terminal 20. It is effective that the information sent from the communicating means 22 includes topic information peculiar to that area, such as traffic jam information, traffic accident information, weather, temperature and the like.

The information received by the communicating means 22 is content information extracted based on the membership information, and includes link information for linking with respect to the primary judging information, or link information for linking with respect to the secondary judging information. The information received by the communicating means 22 may also include the secondary judging information, especially detailed map information of that area. Information may be sent and received using the communicating means 22 in a method in which required information is selected in stages in a conversational manner. The content information to be received may be selected by terminal information sent by the communicating means 22.

Content information received by the communicating means 22 is stored in the storing means 23. The received content information may directly be stored in the medium 30 without being stored in the storing means 23. The detailed map information of that area and the content information peculiar to that area may previously be stored in the storing means 23.

The writing means 24 may store information into a magnetic medium or an optical medium such as CD-R, CD-RW, DVD-R, FD and the like, or may store information in a storing section of a user's apparatus using communicating means such as Bluetooth.

Content information such as restaurant, amusement, tourism guidance, hotel and music service, and link information for linking with respect to the content information are stored in the medium 30 by the writing means 24. The content information may includes the secondary judging information concerning a user such as personal identification information, hobby/taste information and using state/frequency information, as well as map information of that area.

Stored in the medium 30 are content information such as restaurant, amusement, tourism guidance, hotel and music service, the primary judging information such as position information, time information, climate information and environment information, and link information for linking with respect to the content information.

A user can utilize the content information stored in the medium 30 using a data providing apparatus 40. It is preferable that the data providing apparatus 40 has a navigation function for outputting current position information.

The data providing apparatus 40 comprises reproducing means 41 for reading the medium 30, time information inputting means 42 having a clock function and capable of inputting time information, communicating means 43 for inputting the primary judging information such as climate information and position information, position detecting means 44 such as a GPS, position information inputting means 45 for judging a current position by information from the communicating means 43 or the position detecting means 44, control means 46 for controlling the reproducing means 41, the time information inputting means 42, the communicating means 43, the position information inputting means 45 and the like, and display means 47 for displaying the content information and the map information. The system is not always required to have all of the time information inputting means 42, the communicating means 43, the position detecting means 44 and the position information inputting means 45. For example, when time information and position information can be obtained using the communicating means 43, the time information inputting means 42 and the position detecting means 44 are unnecessary. The communicating means 43 may not have the data providing apparatus 40, and may include I/O section to which a portable terminal such as a cellular phone can be connected.

If primary judging information such as position information, time information, climate information and environment information is inputted through the inputting means (not shown), the control means 46 of the data providing apparatus 40 extracts content information stored in the medium 30 based on the inputted primary judging information and displays the content information on the display means 47.

A user can reserve and register contents such as hotel and restaurant from the data providing apparatus 40. Reservation information concerning the utilization of the contents is sent to the management server 10 from the communicating means 43 together with identification information of that user, and the information is sent to a content provider 60 from the management server 10. The reservation information is registered in the user management database 12 as secondary judging information concerning a user who made this reservation.

The user previously registers (user registration) for utilizing a user providing system according to this embodiment.

The user registration is carried out by accessing the management server 10 using the communicating means such as the Internet or the telephone line from the information terminal 50 such as a cellular phone.

The user registration is carried out by sending personal identification information such as a name or a designation and address of the user, but it is preferable to register the user together with personal information concerning hobby or taste.

Contents accumulated in the management server 10 are registered by accessing the management server 10 using the communicating means such as the Internet or the telephone line from the information terminal by means of the content provider 60 who provides restaurant, amusement, tourism guidance, hotel, music service and the like.

To register the contents, the management server 10 utilizes Web pages in the Internet and provides information requesting content information to the content provider 60. The management server 10 receives content information from the content provider 60.

Next, a data providing apparatus according to another embodiment will be explained using FIG. 2.

Figure 2:
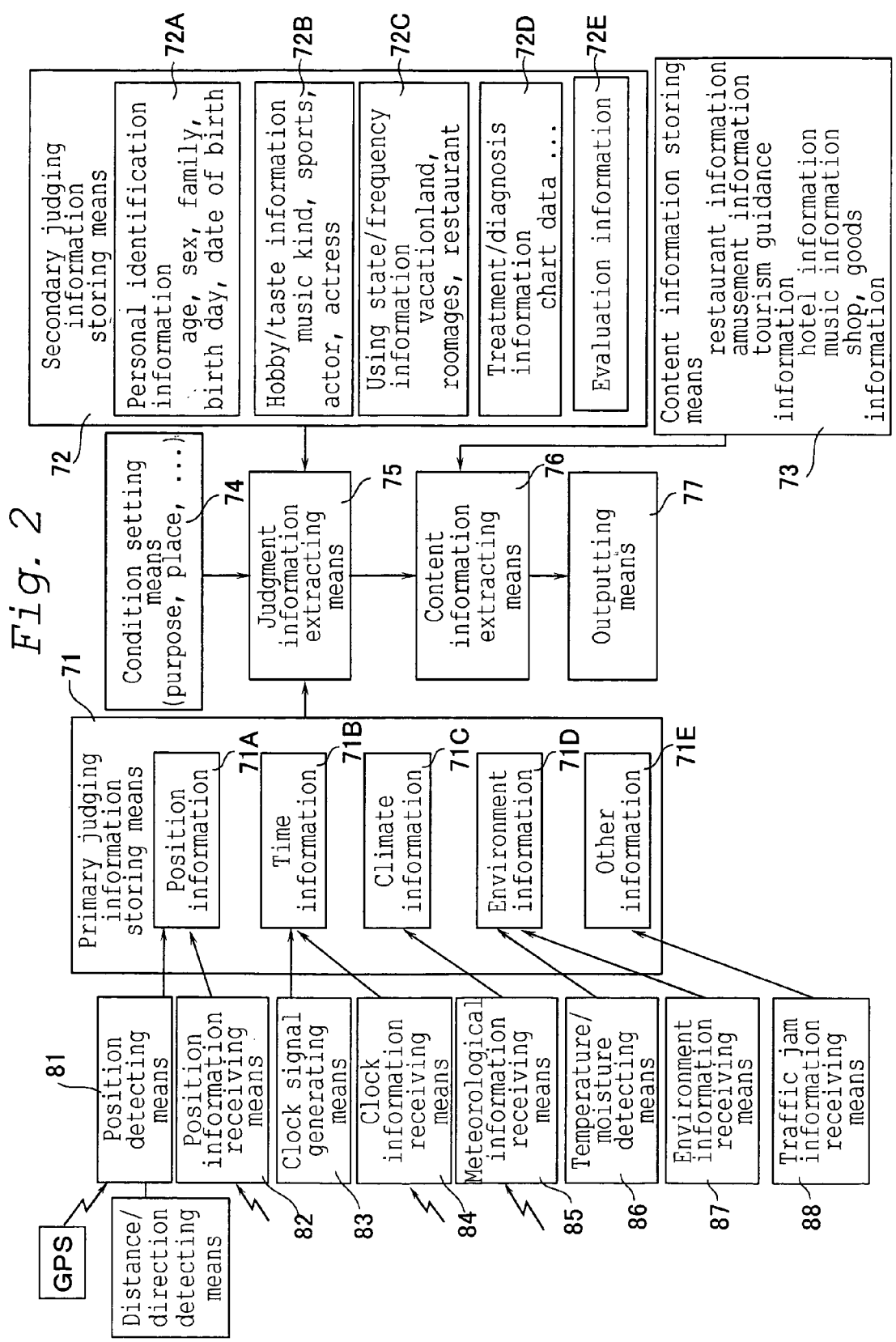
FIG. 2 is a block diagram of functions of a data providing apparatus according to the embodiment.

FIG. 2 is a block diagram of functions of the data providing apparatus according to the embodiment.

As shown in FIG. 2, the data providing apparatus of this embodiment comprises a primary judging information storing means 71 for storing the primary judging information, a secondary judging information storing means 72 for storing the secondary judging information, content information storing means 73 for storing content information, condition setting means 74 for selecting judgment information from the primary judging information and the secondary judging information, judgment information extracting means 75 for extracting judgment information selected by the condition setting means 74 from the primary judging information storing means 71 or the secondary judging information storing means 72, content information extracting means 76 for extracting content information linked with the judgment information extracted by the judgment information extracting means 75, and outputting means 77 for displaying the content information extracted by the content information extracting means 76.

Examples of the primary judging information stored in the primary judging information storing means 71 are position information 71A, time information 71B, climate information 71C, environment information 71D, and other information 71E. For example, the position information 71A is obtained by position information receiving means 82 which receives position information utilizing a base station such as a portable terminal or the position detecting means 81 which detects a position by obtaining a signal from a GPS or a distance/direction detecting means. The time information 71B is obtained by clock signal generating means 83 or clock information receiving means 84 which receives clock information. The climate information 71C is obtained by meteorological information receiving means 85 which receives meteorological information. The environment information 71D is obtained by temperature/moisture detecting means 86 or environment information receiving means 87 which receives environment information. The other information 71E is obtained by traffic jam information receiving means 88 which receives traffic jam information and the like.

Examples of the secondary judging information stored in the secondary judging information storing means 72 are personal identification information 72A, hobby/taste information 72B, using state/frequency information 72C, treatment/diagnosis information 72D and evaluation information 72E. The personal identification information 72A is information concerning age, sex, family, birthday, birth date and the like, and is registered at the time of the user registration. The hobby/taste information 72B is information concerning music kinds, sports, actor, actress, and is registered from the utilization result of the content information at the time of the user registration or after the user registration. The using state/frequency information 72C is information such as resort, lodging, restaurant and the like, and is registered in accordance with the utilizing track record of the user. The treatment/diagnosis information 72D is information such as chart data, and is registered by data supplied by medical institution or the user himself or herself. The evaluation information 72E is registered by a result of questionnaire concerning the institution or resort.

The content information storing means 73 includes link information which links with the primary judging information or the secondary judging information.

According to the data providing apparatus of this embodiment, if a user sets a condition concerning a purpose, a place or the like using the condition setting means 74, the judgment information extracting means 75 extracts the selected judgment information from the primary judging information storing means 71 or the secondary judging information storing means 72. The setting by the condition setting means 74 is carried out by user's input or by inputting or reading a user's name. When the user's name is input or read, information which is previously registered as user's information is set.

If the judgment information is extracted by the judgment information extracting means 75, content information linked with the judgment information by the content information extracting means 76 is extracted.

The content information extracted here is displayed by the display means 77.

Next, a data-providing service system according to another embodiment of the present invention will be explained.

Figure 3:
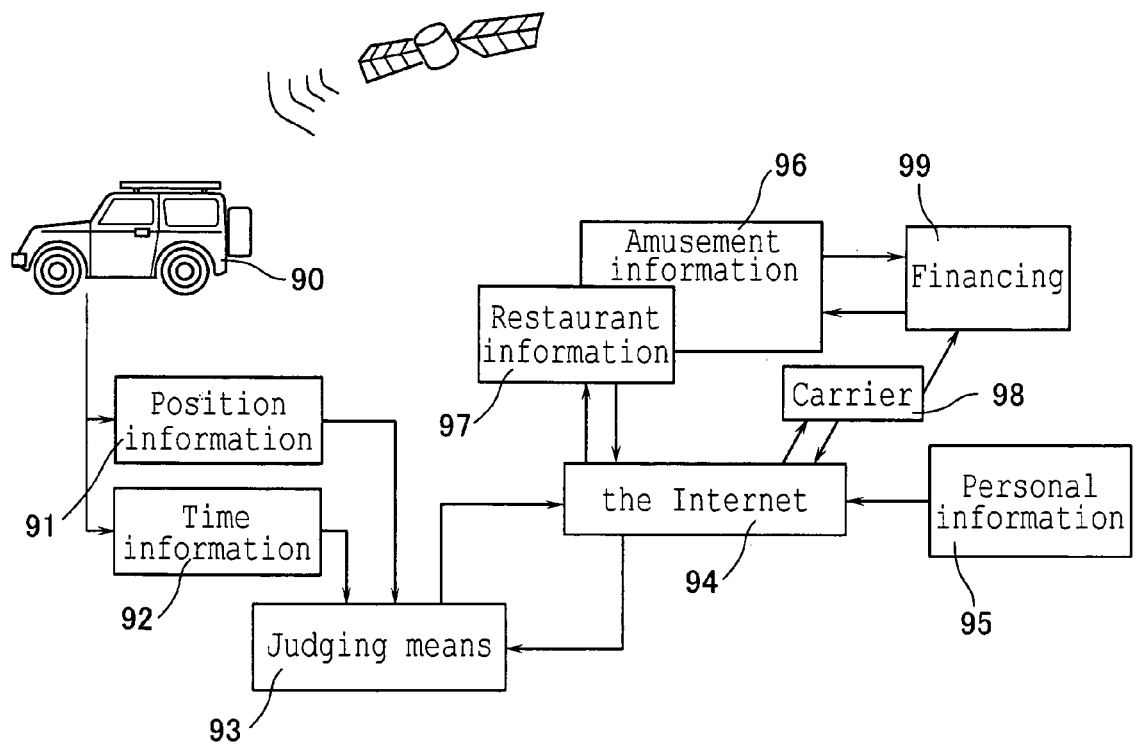
FIG. 3 is a schematic block diagram of a data-providing service system of the embodiment.

FIG. 3 is a schematic block diagram of the data-providing service system of this embodiment.

As shown in FIG. 3, the data-providing service system of this embodiment inputs position information 91 for specifying a current position and time information 92 into judging means 93 from an apparatus having a navigation function disposed in a vehicle 90. The judging means 93 sends personal identification information or the like through the Internet 94, thereby obtaining personal information 95 corresponding to the personal identification information. The judging means 93 also obtains amusement information 96, restaurant information 97 or the like corresponding to the current position. The judging means 93 selects the amusement information 96 and the restaurant information 97 suitable for the taste of the user from the personal information 95, the position information 91 and the time information 92 in accordance with variation in the current position, and displays the information using the display means mounted in the vehicle 90.

The using state data to be provide the service is sent to a carrier 98 through the Internet 94, and fee is paid to the content provider from a financing 99 through the carrier 98.

Figure 4:
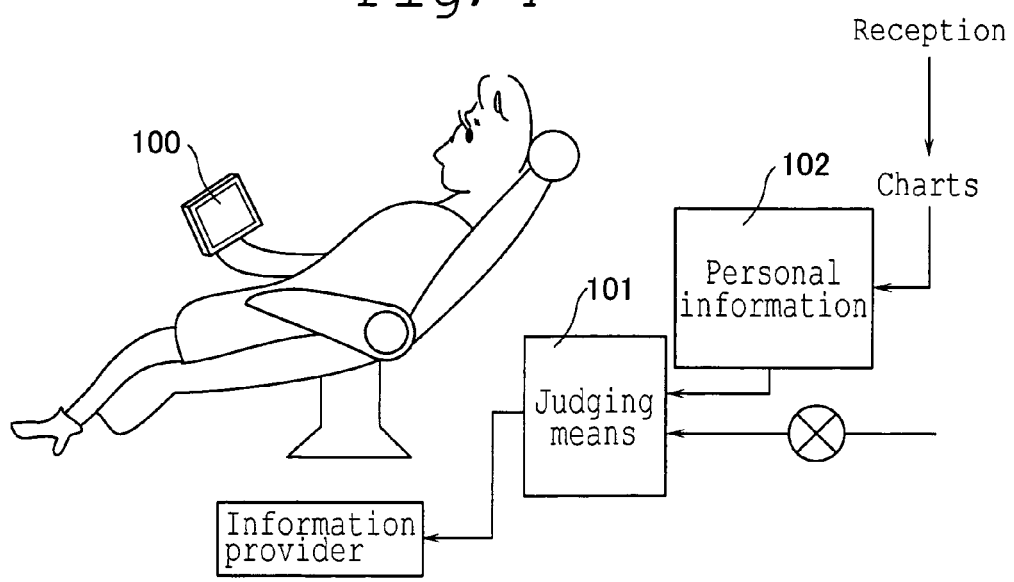
FIG. 4 is a schematic block diagram of a data-providing service system of another embodiment.

FIG. 4 is a schematic block diagram of a data-providing service system of another embodiment.

The data-providing service system shown in FIG. 4, a data providing apparatus 100 owned by a user provides information based on personal information of a customer when the customer is waiting in a waiting room or being consulted in a consultation room in a hospital for example.

That is, personal information 101 such as charts contents are inputted into judging means 102 together with information concerning goods or other services, and the information is provided for the user.

According to this embodiment, it is possible to provide goods or treatment related with chart data of a user, and other service information.

INDUSTRIAL APPLICABILITY

As apparent from the descriptions of the above embodiments, according to the present invention, it is possible to provide a data-providing service system which plays music suitable for a purpose, a place or a season at the time of utilization, or which displays a restaurant or a roomage suitable for hobby and taste of a user.

According to the invention, a user can obtain content information peculiar to that area utilizing a terminal installed in each area.

What is claimed is:

1. An information providing terminal apparatus comprising
    inputting means for inputting primary judging information such as position information, time information, climate information, environment information and the like;
    secondary judging information concerning a user such as personal identification information, hobby/taste information, using state/frequency information and the like;
    communicating means for sending data inputted by said inputting means, and for receiving content information such as restaurant, amusement, tourism guidance, hotel, music service and the like extracted based on said data, and
    writing means for storing, in storing medium, said content information received by said communicating means,
    wherein the using state/frequency information is based on the past track record of the user including resorts, lodgings, and restaurants previously used.

2. The information providing terminal apparatus according to claim 1, wherein said content information includes link information for linking with said primary judging information, or link information for linking with said secondary judging information.

3. A data providing apparatus comprising
    primary judging information storing means for storing primary judging information such as position information, time information, climate information, environment information and the like;
    secondary judging information storing means for storing secondary judging information concerning a user such as personal identification information, hobby/taste information, using state/frequency information and the like;
    content information storing means for storing content information having link information which links said primary judging information and the secondary judging information with each other,
    condition setting means for selecting judgment information from said primary judging information and said secondary judging information,
    judgment information extracting means for extracting said judgment information selected by said condition setting means from said primary judging information storing means or said secondary judging information storing means, content information extracting means for extracting content information linked with said judgment information extracted by said judgment information extracting means, and
    outputting means for displaying content information extracted by said content information extracting means,
    wherein the using state/frequency information is based on the past track record of the user including resorts, lodgings, and restaurants previously used.

* * * * *